R. J. RASMUSSEN.
HAY LOADER.
APPLICATION FILED JULY 22, 1912.
1,057,579.
Patented Apr. 1, 1913.
3 SHEETS—SHEET 1.
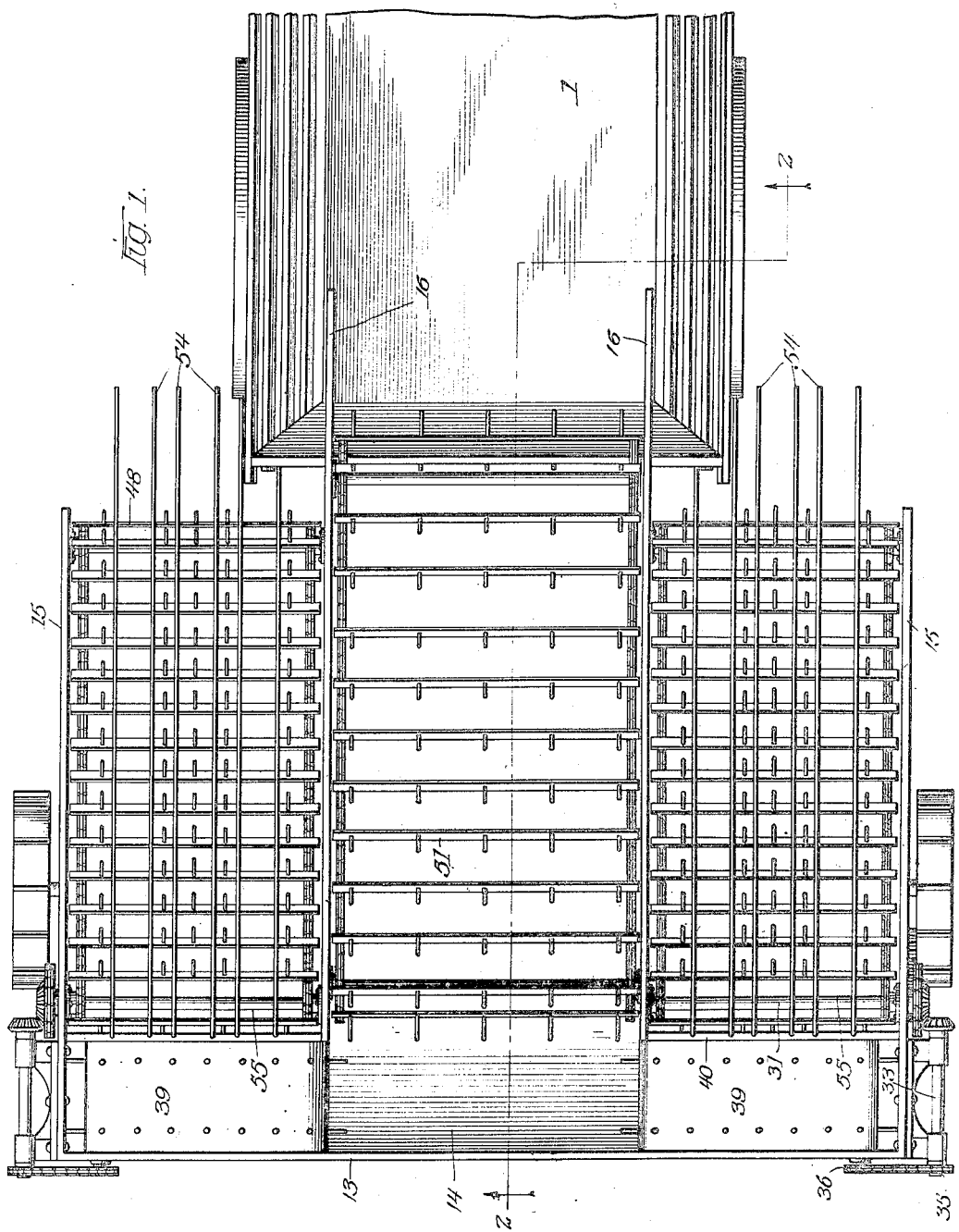

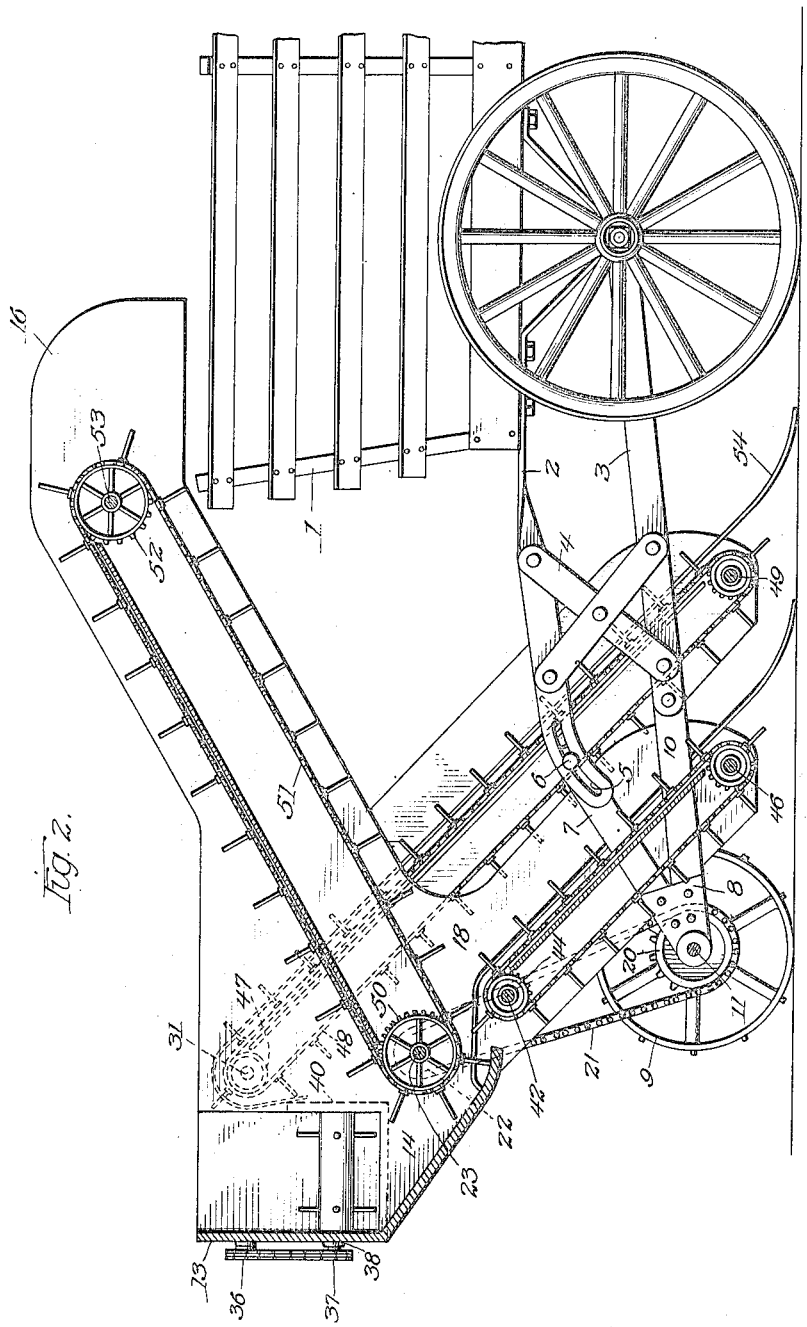

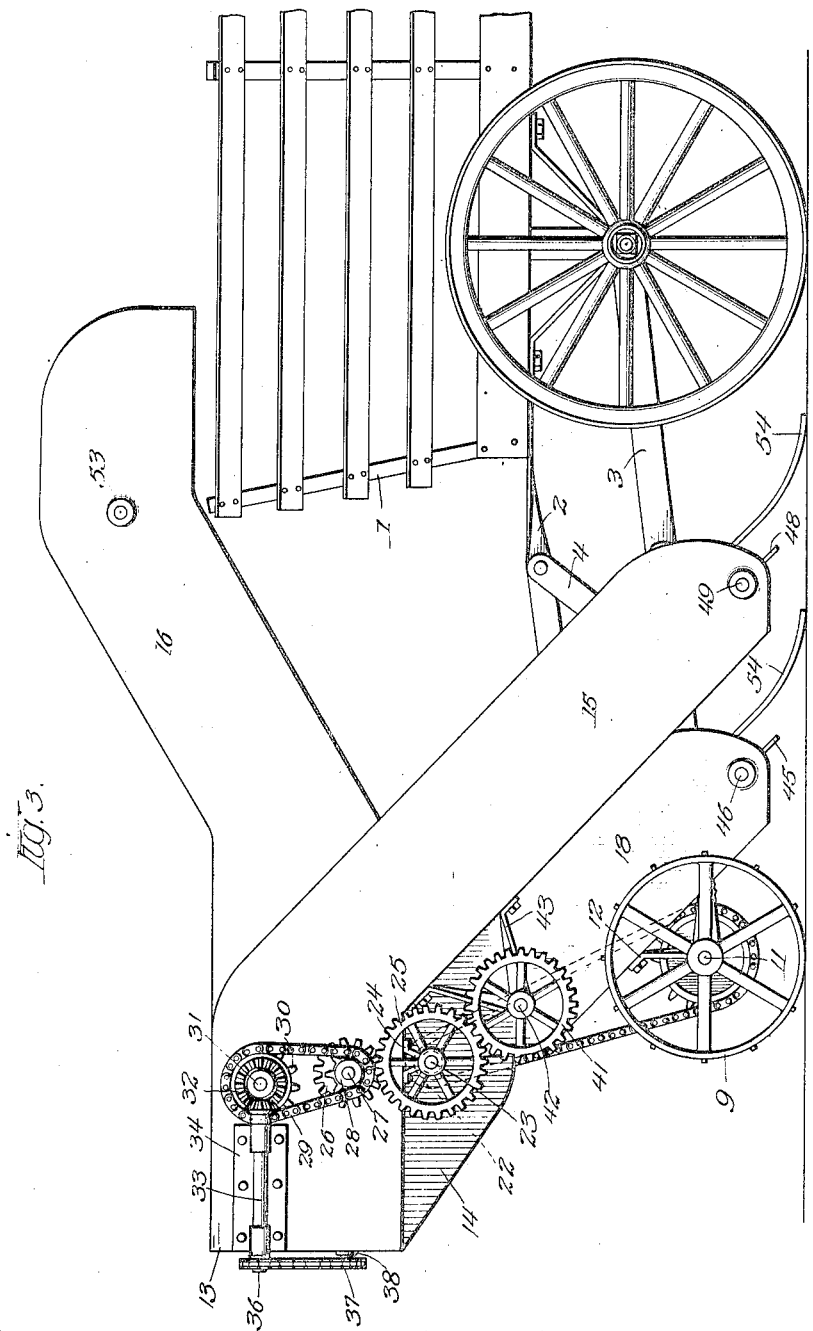

UNITED STATES PATENT OFFICE.

RASMUS J. RASMUSSEN, OF CHICAGO, ILLINOIS.

HAY-LOADER.

1,057,579.   Specification of Letters Patent.   Patented Apr. 1, 1913.

Application filed July 22, 1912. Serial No. 710,965.

*To all whom it may concern:*

Be it known that I, RASMUS J. RASMUSSEN, a citizen of Denmark, residing at Chicago, in the county of Cook and State of Illinois, have invented certain new and useful Improvements in Hay-Loaders, of which the following is a specification.

This invention relates to improvements in hay loaders and more particularly to that class of hay loaders adapted to be attached to the rear end of a vehicle and drawn over the cut hay which it automatically conveys from the ground to and deposits in the said vehicle. Its object is to provide a device of this class that will gather up the hay in the immediate path of the vehicle by which it is drawn and that also covers a path to either side of said vehicle.

My loader comprises a pair of lateral conveyers one on each side of the machine that lead to end conveyers upon which they deposit their load; the said end conveyers running toward each other and depositing the load in a suitable pit formed in the frame from which the hay is picked up by another conveyer and carried to the propelling vehicle. I further provide a centrally disposed conveyer for picking up hay in the path of the propelling vehicle and carrying it to the said pit. The two lateral conveyers are identical and also the power transmission mechanism operating them.

With the foregoing and other objects in view the invention consists in the combination and arrangement of parts to be hereinafter fully described in the following specification, pointed out in the claim and illustrated in the accompanying drawings which form a part of the specification and in which—

Figure 1 is a top plan of my hay loader in position at the end of a vehicle. Fig. 2 is a vertical section taken on line 2—2 of Fig. 1. Fig. 3 is a side elevation of my improved hay loader in position at the end of a vehicle.

Like reference characters indicate corresponding parts throughout the several views.

1 is a hay wagon of any desired construction to either side of which upper and lower connecting arms 2 and 3, respectively, are secured and to give strength and rigidity to the connecting frame so formed a cross connecting brace 4 is provided. The upper arm 2 is slottted terminally as at 5 to permit engagement with a connecting pin 6 carried by an upper arm 7 of a truck 8 mounted upon suitable traction wheels 9—9 and further provided with a lower connecting arm 10 at either side to engage the aforesaid lower arms 3. The traction wheels 9—9 also serve as drive wheels for the hay loading mechanism hereinafter to be described. Upon the axle 11 of the wheels 9—9 the framework of my loader is supported by suitable braces 12. This framework comprises an end wall 13, angular side walls 15, 15, interior partition walls 16, 16 and centrally disposed inclined walls 18, 18.

14 is a pit formed below the lower termination of end wall 13. Upon the axle 11 which is the drive shaft of the device sprocket wheels 20 are secured that carry chains 21 that engage other sprocket wheels 22 mounted upon shafts 23 journaled in bearings 24 secured to the walls 15. Upon the shafts 23 gear wheels 25 are terminally mounted which engage gear wheels 26 disposed upon stub shafts 27 carried by walls 15, that also carry sprockets 28 whose chains 29 engage sprockets 30 disposed upon shafts 31 journaled in the walls 15 of the loader.

32 is a bevel gear terminally carried by either shaft 31 by means of which the transmission shafts 33 journaled in bearings 34 secured to the walls 15 are rotated and which latter shafts are provided with terminal gears 35 that are chain-connected to gears 36 carried by stub shafts secured to the wall 13 and which are chain-connected to gears 37 carried by terminal shafts 38 of end conveyers 39 the opposite end of which shafts 38 are mounted in suitable bearings 40 carried by the end wall 13 below the end conveyers and by walls 15.

41, 41 are gear wheels in mesh with gears 25, 25 and mounted upon shafts 42, 42 journaled in bearings 43, 43 secured to the walls 18, 18 and upon these shafts one sprocket 44 of a conveyer 45 is disposed, the opposite end of said conveyer being carried by similar sprocket wheels disposed upon a transverse shaft 46 journaled in the lower end of the walls 18, 18. Upon the shafts 31 sprockets 47 are provided carrying one end of a conveyer 48 the lower end of which is carried by similar sprockets mounted upon transverse shafts 49 journaled in the walls 15, 15 of the device. Upon the shafts 23 sprocket wheels 50, 50 are disposed which carry one end of a conveyer 51, the opposite end of said conveyer being carried upon sprocket wheels 52, 52 disposed upon a shaft 53 mounted in the walls 16, 16.

54 represents the hay guides secured to transverse sleeves 55 secured to the shafts of the conveyer as shown, and they pick up the hay from off the ground and guide it to the conveyers. The conveyer 45 takes hay from the path of the vehicle and empties it into the pit 14 from which it is picked up by conveyer 51 and carried to the vehicle; the conveyers 48 take the hay from their guides and carry it to the transverse end conveyers from which it is thrown into the pit 14 from which it is picked up by the central conveyer 51 and carried to the vehicle 1.

What is claimed is:—

In a hay loader having a suitable framework mounted upon a wheeled truck provided with projecting arms to engage a propelling vehicle, a pit formed in said framework, a conveyer carried by said framework leading from said pit to the said propelling vehicle, transmission mechanism connecting the said conveyer and the said wheeled truck, a centrally disposed conveyer disposed immediately below said pit carried by said framework, transmission mechanism connecting the said conveyers, transverse end conveyers carried by the said framework above the said pit, lateral conveyers carried by said framework adjacent said transverse end conveyers, power transmission mechanism connecting said lateral conveyers with the said end conveyers, transmission mechanism connecting said lateral conveyers and the first mentioned conveyer and hay guides carried by the said lateral conveyers and centrally disposed conveyers for picking up the hay.

In testimony that I claim the foregoing as my own I have hereto affixed my signature in the presence of two subscribing witnesses.

RASMUS J. RASMUSSEN.

Witnesses:
H. J. SANDERS,
PAUL A. VIERSEN.